United States Patent [19]
Malwitz et al.

[11] Patent Number: 6,005,015
[45] Date of Patent: Dec. 21, 1999

[54] POLYOLEFIN PRODUCTS AND PROCESS ADDITIVES THEREFOR HAVING REDUCED TRANSFER TO SUBSTRATES

[75] Inventors: Nelson E. Malwitz, Brookfield; Natarajan S. Ramesh, Danbury, both of Conn.

[73] Assignee: Sealed Air Coporation, Saddle Brook, N.J.

[21] Appl. No.: 08/944,732

[22] Filed: Oct. 6, 1997

Related U.S. Application Data

[60] Provisional application No. 60/042,488, Apr. 2, 1997.
[51] Int. Cl.$^6$ .................................................. C08J 9/00
[52] U.S. Cl. ................................ 521/94; 521/79; 521/97; 521/142; 521/143; 521/144; 521/149; 252/351
[58] Field of Search ................................ 521/79, 97, 142, 521/143, 94, 144

[56] References Cited

U.S. PATENT DOCUMENTS 5,750,584   5/1998   Knaus ........................................ 521/79

FOREIGN PATENT DOCUMENTS 0 001 791   5/1979   European Pat. Off. .
WO 97/27598  8/1997   WIPO .

OTHER PUBLICATIONS

Patent Abstracts of Japan, vol. 018, No. 511 (C–1253), Sep. 27, 1994 & JP 06 172579 A, Jun. 21, 1994.

*Primary Examiner*—Morton Foelak
*Attorney, Agent, or Firm*—Alston & Bird LLP

[57] ABSTRACT

A process additive for polyolefin films and foams produces products having reduced greasiness and reduced grease-like transfer as compared to glycerol monostearate (GMS). The process additive comprises a fatty acid N-aliphatic alcohol amide of the general formula R—CON(R')R". R is a fatty hydrocarbon radical having from about 8 to 30 carbons. R' typically is hydrogen. R' can also be an alkyl radical of from about 1 to 6 carbons or an alkyl alcohol radical of from about 1 to 6 carbons. R" is an alkyl alcohol fragment of from about 1 to 6 carbons. The alkyl alcohol fragments can be monohydric or polyhydric. Secondary fatty monoalkanolamides in which R' is hydrogen are particularly useful, especially stearamide monoethanolamine (MEA). The benefits of the invention can be achieved and enhanced in some examples by mixing the fatty acid N-aliphatic alcohol amide with an ester of a long chain fatty acid with a polyhydric alcohol, including GMS. Examples of fatty acid N-aliphatic alcohol amides include cocamide MEA, lauramide monoisopropylamine (MIPA), oleamide MIPA, and stearamide 2,3-propanediol.

22 Claims, 6 Drawing Sheets

POLYOLEFIN PRODUCTS AND PROCESS ADDITIVES THEREFOR HAVING REDUCED TRANSFER TO SUBSTRATES

CROSS REFERENCE TO RELATED APPLICATION

This application is related to commonly owned Provisional Application Ser. No. 60/042,488, filed Apr. 2, 1997, and claims the benefit of its earlier filing date under 35 U.S.C. 119(e).

FIELD OF THE INVENTION

This invention relates to products made from polyolefins and process additives used in connection therewith. In particular, this invention relates to extrudable compositions for producing polyolefin films and to expandable compositions for producing polyolefin foam products.

BACKGROUND OF THE INVENTION

Various processes and equipment for extrusion foaming of thermoplastic resins have been used for many years. Generally, solid pellets of thermoplastic resin are fed through a hopper to a melting zone in which the resin is melted, or plasticized, to form a flowable thermoplastic mass. The plasticized thermoplastic mass generally is then transported to a mixing zone where the thermoplastic mass is thoroughly mixed with a blowing agent under pressure for subsequent cooling and substantially free expansion of the resin to form a foam. The blowing agent expands the molten mass to form the cells of the foam and the thermoplastic foam is cooled.

The blowing agent gradually diffuses from the cells of the foam and is eventually replaced by air diffusing into the cells. Diffusivity of the blowing agent and the selection and use of appropriate blowing agents are important aspects of foam manufacture. If the diffusivity of a blowing agent out of the cells of a foam is too fast compared to the diffusivity of air, so that the blowing agent is not replaced by air as it escapes, then the foam typically collapses and is said to have dimensional stability problems. For many years, chlorofluorocarbons ("CFCs") were used that had excellent diffusivity characteristics and resulted in high quality, dimensionally stable foam products. However, CFCs are no longer acceptable as blowing agents because of global regulations prohibiting their use.

Other compounds, including lower hydrocarbons, alcohols and ketones, various hydrofluorocarbons, and inert gases have been proposed as alternative blowing agents to CFCs. Some of these compounds diffuse out of the foam cells at a rate that reduces dimensional stability and can result in collapse of the foam cells. Aging modifiers have been developed for incorporation into polyolefin resins that slow the diffusion of selected blowing agents out of the polyolefin foam cells. These aging modifiers are sometimes referred to as permeability modifiers or stability control agents. Among the various aging modifiers that have been proposed are the saturated higher fatty acid amides, saturated higher aliphatic amines, esters of saturated higher fatty acids, copolymers of ethylene and unsaturated carboxylic acids, and others.

One of the more widely used aging modifiers for polyolefin foams is glycerol monostearate. Glycerol monostearate is also added to resins for extrusion to form films. Glycerol monostearate is also called GMS, glyceryl monostearate, and monostearin. GMS is a monoglyceride and is an ester of stearic acid, which is $C_{18}$ acid, and the trihydric alcohol glycerol. GMS is a pure white or cream colored and wax-like solid.

GMS and other similar aging modifiers are thought to coat the walls of the foam cells to slow the blowing agent gas from escaping and thereby to prevent collapse of the cells of the foam. However, these aging modifiers can leave a grease-like residue on the surface of the foam that can be transferred to objects that come into contact with the foam. The transfer of this grease-like residue to certain substrates is problematic and is particularly undesirable on optical products and high gloss finishes.

GMS also tends to slow the rate of blowing agent diffusion from the cells to the point that some residual blowing agent is maintained in the cells for an undesirably long period of time after manufacture. Too slow a rate of blowing agent diffusion from the cells of the foam can result in dimensional stability problems. Foam rolls can become tight in storage.

It would be desirable to provide a foam product in which an acceptable blowing agent would escape from the cells of the fresh foam at a rate that more closely matches the rate of air entering the cells of the foam to substantially eliminate dimensional changes in the foam upon aging. It would also be desirable to provide foam and other products, including films, in which transfer of grease-like residue to substrates is reduced.

SUMMARY OF THE INVENTION

The invention relates to process additives for polyolefin products that can substantially reduce greasy deposits on substrates and, in foams, promotes an increased rate of escape of blowing agent from the cells as compared to glycerol monostearate (GMS) alone. The process additive comprises at least one fatty acid N-aliphatic alcohol amide and can be a secondary or tertiary amide.

An ester of a long chain fatty acid with a polyhydric alcohol, including GMS, can be used with the amide, while still achieving the benefits of the invention. The two components can be added to the polyolefin resin either in admixture or separately. The amide and the ester have been observed to exhibit a substantially single differential scanning calorimetry (DSC) melting point that varies linearly depending on the relative amounts of amide and ester, thus signifying some chemical compatibility. It has also been observed that the transfer of grease-like residue is more substantially reduced when both the ester and the amide are present in the polyolefin resin than when the amide is used in the absence of the ester.

Typically the ester and the amide are present in the process additive in a ratio of the ester to the amide of from about 0:1 to 10:1. The polyolefin and process additive typically are present in a ratio of from about 100:0.01 to 100:5, respectively.

The fatty acid N-aliphatic alcohol amide is a secondary or tertiary amide having the formula R—CON(R')R". R is a fatty hydrocarbon radical having from about 8 to 30 carbons. R' typically is hydrogen. R' can also be an alkyl radical of from about 1 to 6 carbons or an alkyl alcohol radical of from about 1 to 6 carbons. R" is an alkyl alcohol fragment of from about 1 to 6 carbons. The alkyl alcohol fragments can be monohydric or polyhydric. Secondary fatty monoalkanolamides, in which R' is hydrogen and which have the general formula RCONHR", are particularly useful process additives.

One method of preparing the amide is to react a fatty acid with an alkanolamine, especially a monoalcohol amine. The amine group of the alkanolamine is substituted for the hydroxyl moiety of the fatty acid carboxyl group to form a molecule having a fatty acid amide moiety and an aliphatic alcohol moiety characterized by the attachment of the alcohol moiety to an amide nitrogen. The fatty acid is typically coconut acid, lauric acid, stearic acid, palmitic acid, or oleic acid. The alkanolamine is typically monoethanolamine (MEA), monoisopropanol amine (MIPA), n-propanolamine, betapropanolamine, or 2,3-propanediol amine. An example is the fatty monoalkanolamide stearyl monoethanolamide, which has the formula $CH_3(CH_2)_{16}CONHCH_2CH_2OH$ and is sometimes called stearamide MEA. Another example, in which the alcohol is dihydric, is stearyl 2,3-dihydroxy propyl amide, which is also called stearamide 2,3-propanediol and which has the formula $CH_3(CH_2)_{16}CONHCH_2CH(OH)CH_2OH$.

The invention includes polyolefinic compositions that are films or foams and compositions for preparing polyolefin foam products in which the above process additive is incorporated. Typically, the resin is selected from the group consisting of ethylene or propylene homopolymers and copolymers of ethylene or propylene and a copolymerizable monomer.

The invention includes a polyolefin foam product that comprises an expanded polyolefin made from the foamable composition described above. Grease-like transfer to substrates is substantially reduced as compared to GMS alone. Sheet products are useful because sheet products are most typically used to protect high gloss finishes, optical products, and the like. However, the invention is also applicable to plank foam products and to films.

Thus the invention provides a process additive that can function as an effective aging modifier, a foamable composition containing the process additive, and a polyolefinic foam made from the foamable composition. The foam exhibits reduced grease-like transfer to substrates and is dimensionally stable. The invention also provides extrudable composititons and films made from them that incorporate a process additive of the invention.

BRIEF DESCRIPTION OF THE DRAWINGS

Some of the features and advantages of the invention have been stated. Other advantages will become apparent as the description of the invention proceeds, taken in conjunction with the accompanying drawings, in which.

DETAILED DESCRIPTION

Figure 1:
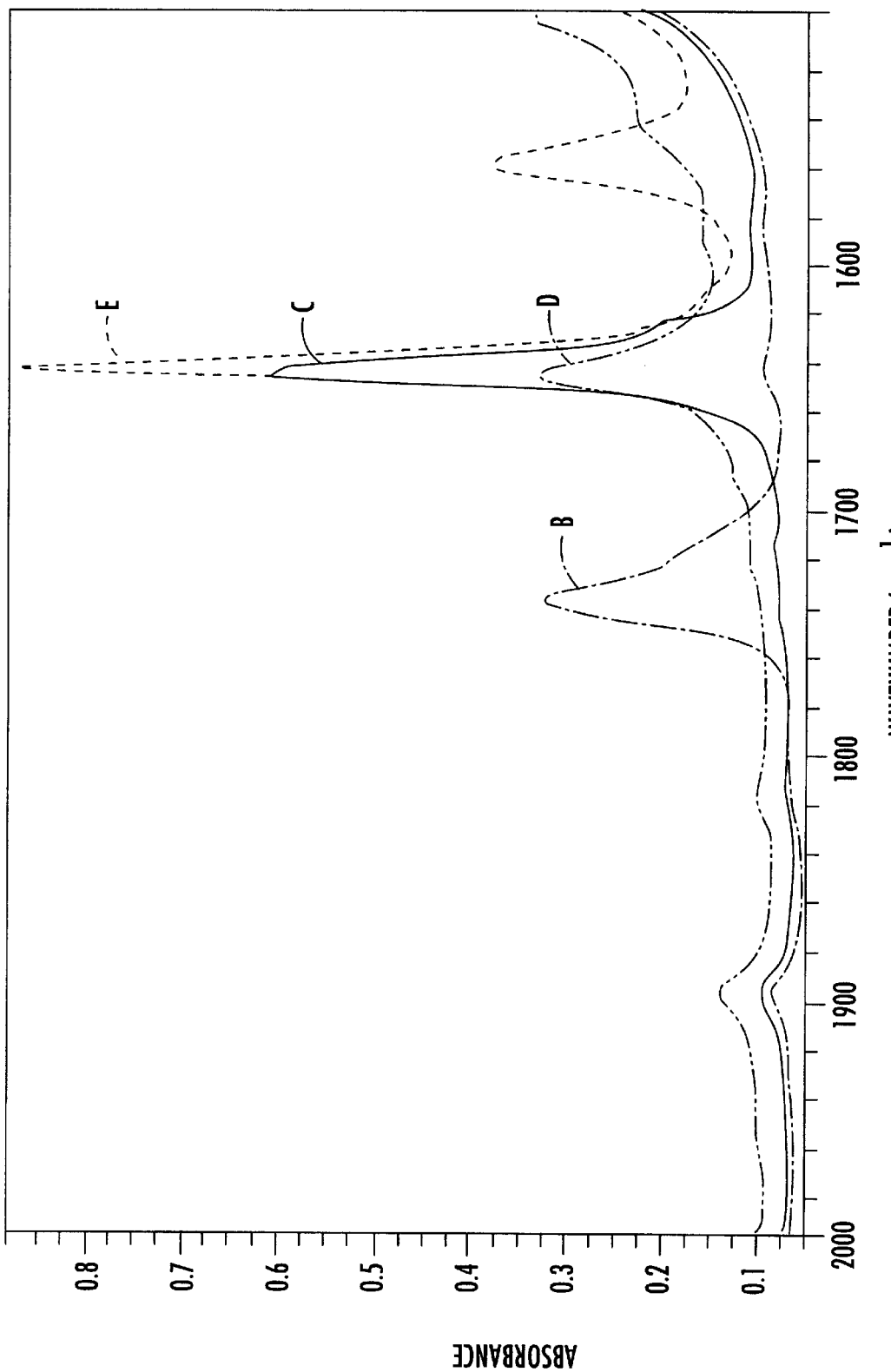
FIG. 1 is a plot of absorbence at various wavelengths for several process additives at 2 percent concentration by weight in a 2 mil thick polyethylene film, including a process additive according to the invention.

Various compounds were evaluated quantitatively as process additives for grease-like transfer to substrates by high performance Fourier-transform infrared spectroscopy (FT-IR). Plots are shown in FIGS. 1 through 3, 6, and 7 of the fraction of absorbence in the mid-infrared region for particular compounds of interest. Infrared radiation is recorded in the customary units of wavenumbers, which are oscillations per centimeter and are read as reciprocal centimeters. The mid-infrared region of from about 200 to 4,000 $cm^{-1}$ corresponds to wavelengths of light of from about 50 to 2.5 microns.

Spectroquality potassium bromide (KBr) crystal was chosen as a useful candidate for studying grease-like transfer from a foam surface to a glass-like or highly polished substrate. KBr crystal typically is used in FT-IR spectroscopy. KBr crystal absorbs no infrared light in the spectrum from 4000 to 400 $cm^{-1}$, which are the wavenumbers of interest. KBr crystal was used in all of the examples shown below except as otherwise noted, and is sometimes referred to below as "glass."

Chemical formulas for various compounds that were analyzed by FT-IR spectroscopy, including a compound in accordance with the invention, are shown below in Table 1 and are identified in the Figures by letter codes A through H. Kemamide S-180(C), Kemamide S(D), Alkamide S-280(E), Alkamide L-203(F), and Alkamide LIPA are tradenames for various commercial products corresponding to the formulas and letter codes as shown in Table 1. SAPD designates stearamide 2,3-propanediol. The Kemamides are available from Humko Chemical Division of Witco Corporation, which is located in Memphis, Tenn. The Alkamides are available from Rhone-Poulenc, which is located in Cranbury, N.J. SAPD was made by and is available from Rhone-Poulenc by special request. Alkamide S-280, Alkamide L-203, Alkamide LIPA, and SAPD are all examples of compounds useful as process additives in accordance with the invention.

There are two principal grades of glycerol monostearate (GMS) used in the plastics industries as process additives, including aging modifiers. One grade, identified below as "B" in Table 1, is derived from hydrogenated tallow that contains about 65 percent stearic acid radicals and about 30 percent palmitic acid radicals. The tallow is esterified with glycerol and typically contains about 56 percent monoester, 37 percent diester, and 7 percent of the triester. This grade of GMS is what is typically referred to commercially as "GMS" or as glycerol mono/distearate. It is available from Witco Corporation, Humko Chemical Division, Memphis, Tenn., under the designation Atmos 150. It is also available under the designation Pationic 1052, which is sold by the American Ingredients Company, Patco Polymer Additives Division, Kansas City, Mo.

Another grade of GMS is the distilled ester, d-GMS, which is identified as "A" in Table 1, Distilled GMS typically contains about 96 percent of the monoester. Distilled GMS is available under the designations Atmer 129 and Pationic 902 from Witco and Patco, respectively, whose locations are given above.

TABLE 1

COMPOUND FORMULAS

| Letter Code | Name | Formula | R Group |
|---|---|---|---|
| A | Distilled Glycerol Monostearate, 96% | R—COOCC(OH)COH | Stearyl |
| B | Glycerol Mono/distearate | R—COOCC(OH)COH, 55% (R—COOC)$_2$COH, 37% | Stearyl |
| C | Kemamide S-180 | R—CONHR | Stearyl |
| D | Kemamide S | R—CONH$_2$ | Stearyl |
| E | Alkamide S-280 | R—CONH—C—C—OH | Stearyl |
| F | Alkamide L-203 | R—CONH—C—C—OH | Lauryl |
| G | Alkamide LIPA | R—CONH—C—C(CH$_3$)OH | Lauryl |
| H | SAPD | R—CONH—C—C(OH)COH | Stearyl |

As can be seen from Table 1, compounds E and F, which are useful as process additives in accordance with the invention, are stearyl- and laurylmonoethanolamide, respectively. These compounds are also called stearamide monoethanolamine (MEA) and lauramide MEA, respectively. Stearamide MEA can be represented by the formula CH$_3$(CH$_2$)$_{16}$CONHCH$_2$CH$_2$OH. Lauramide MEA can be represented by the formula CH$_3$(CH$_2$)$_{10}$CONHCH$_2$CH$_2$OH.

Compounds G and H are also useful as process additives of the invention. Compound G is a lauryl monoisopropanol amide and is sometimes referred to as lauramide monoisopropanolamine (MIPA). Compound H is an example prepared from a dihydric alcohol amine, 2,3-propanediol amine.

These fatty monoalkanolamide compounds have the general formula R—CON(R')R", in which R is the stearyl or lauryl group, respectively, R' is H, and R" is an alcohol moiety, ethanol, isopropanol, or 2,3-propanediol moiety.

It is observed that complex molecules of the general formula have a hydrophobic end in the R group that is separated from a hydrophilic end in the R" group. While not wishing to be bound by theory, it is believed that the distinct functionalities of the hydrophobic and hydrophilic portions of the compound may be at least partially responsible for the favorable characteristics of these compounds as process additives, and, in particular, as aging modifiers.

Generally, the process additives of the invention that have these distinct hydrophilic and hydrophobic functionalities comprise at least one fatty acid N-aliphatic alcohol amide. The substituted amide can be either a secondary amide or a tertiary amide and typically will have the formula R—CON(R')R".

These compounds are complex molecules having an amide functional moiety and at least one alcohol functional moiety. These compounds are characterized by the aliphatic alcohol moiety R" attached to an amide group nitrogen and a hydrocarbon group R attached to the carbon of the amide group.

R generally can be any fatty hydrocarbon group of from about 8 to 30 carbons to provide a distinct hydrophobic component of the compound. The preferred fatty portion of the amide is lauryl, stearyl, palmityl, or oleyl, because these are the most economical to use. It should be understood that many commercial grades of fatty acids that may be used to prepare the process additives of the invention are mixtures and typically are not of one pure acid, even though these acids are commonly called by the predominant acid present. For example, commercial grade stearic acid typically has palmitic acid in it. Coconut acid, from which cocamide MEA and similar compounds are derived, typically has a variety of acid chain lengths present that vary from 6 to 18 carbons, but is mostly 10, 12, and 14 carbons.

R' is selected from the group consisting of hydrogen, an alkyl radical of from about 1 to 6 carbons, and an alkyl alcohol or glycol radical of from about 1 to 6 carbons, with the hydroxyl moiety on any carbon in the group. Compounds in which R' is hydrogen are useful and normally are less expensive.

The aliphatic alcohol portion, R", of the amide in Alkamide S-280 and L-203 is an ethanol moiety. However, other alcohols, both monohydric and polyhydric, and having related properties and sufficient chain length in the structure should be useful, although not necessarily with equivalent results. The alcohol provides a distinct hydrophilic portion of the compound and should not introduce a significant hydrophobic portion. For example, Alkamide LIPA and SAPD have an R" portion of isopropyl alcohol and 2,3-propanediol, respectively.

R' and R" can be any monohydric or polyhydric alkyl alcohol radical of from about 1 to 6 carbons. R' usually is hydrogen and R" typically will be a monohydric or polyhydric alkyl alcohol moiety that has from about 1 to 6 carbons. Typically a monohydric alkyl alcohol moiety will be selected from the group consisting of methanol, ethanol, propanol, isopropanol, butanol, pentanol, and hexanol moieties, and in any isomeric form. A polyhydric alcohol moiety typically will be selected from the group consisting of glycols and glycerol. Ethanol, isopropyl, or dihyroxy propanol moieties are useful.

Typically, for economic reasons, the fatty acid N-aliphatic alcohol amide will be the reaction product of a fatty acid and an alkanolamine. The fatty acid can be any of those having from about 8 to 30 carbons, and will usually be either coconut acid, lauric acid, stearic acid, palmitic acid, or oleic acid. The alkanolamine can be a primary amine, including ethanolamine, isopropanolamine, propanolamine, 2,3-propanediol amine, betapropanolamine, and others.

FIG. 1 is a plot of mid-infrared absorbance at various wavenumbers for several compounds B, C, D, and E as identified in Table 1. The absorption level changes with the thickness of the film sample and the infrared absorption characteristics of the particular compound. However, the values shown on the plot of FIG. 1 have been normalized according to film thickness. The area under each peak corresponds to the amount of the compound that is present in the sample. FIG. 1 and similar plots can be used as the basis for determining the relative grease-like transfer characteristics of various compounds when used in foam production for application to glass-like and highly polished surfaces, as explained further hereinbelow.

All of the compounds shown in FIG. 1 are at a two percent concentration in a low density polyethylene resin that has been extruded to a film. The peak at 1730 cm$^{-1}$ for compound B is for a film that contains commercial GMS process additive, which is typically used as an aging modifier and is also used as a slip agent for providing lubricity in the extruder. Three separate peaks are identified at 1650 cm$^{-1}$ for compounds C, D, and E. The peak labeled E is for Alkamide S-280, which is stearyl monoethanolamide and is an example of an aging modifier in accordance with the invention in a low density polyethylene resin that has been extruded to a film. Additional peaks are labeled C for Kemamide S-180 and D for Kemamide S, each of which is in a low density polyethylene resin that has been extruded to a film.

Figure 2:
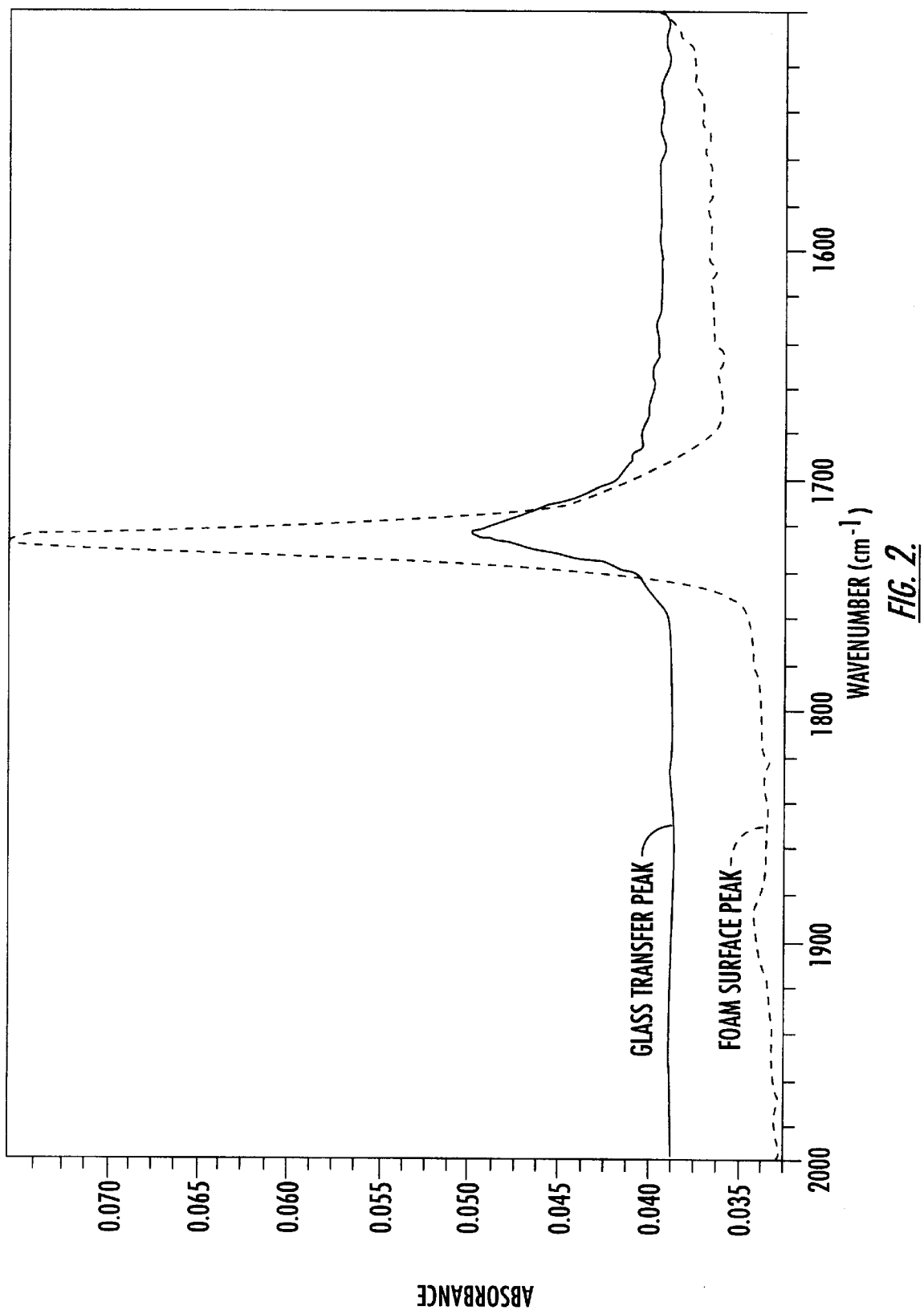
FIG. 2 is a plot showing a concentration of glycerol monostearate (GMS) on the surface of a foam and as transferred to a highly polished KBr window with which the foam has come into contact.

FIG. 2 shows the foam surface peak and the glass transfer peak for a concentration of 1.2 percent of commercial grade GMS in a low density polyethylene resin that was extruded to form a foam of density 1.3 pounds per cubic foot. The foam surface and glass transfer peaks, which are at 1730 cm$^{-1}$, correspond to a carbonyl group in the GMS structure. The large foam surface peak shows absorption in the infrared spectrum due to the presence of GMS aging modifier on the foam surface. The smaller transfer peak shows absorption in the infrared spectrum that is due to GMS aging modifier that has been transferred from the foam surface to the KBr window, which provides a glass-like or highly polished surface.

Quantitative measure of GMS on the surface of the foam and on the surface of the window is obtained by integrating the area under the corresponding peak. The ratio in the area calculated under the two peaks shows the amount of transfer from the foam surface to the window and is a measure of the grease-like transfer of the process additive from the foam.

Table 2, below, shows data obtained in accordance with the procedure outlined for FIGS. 1 and 2 that indicates the grease-like transfer characteristics of a variety of process additives. The data plotted in FIG. 2 corresponds to Example 7 in Table 2, which is a commercial grade GMS and is the benchmark for grease-like characteristics and grease-like transfer.

For each example in Table 2, a circular KBr window of one-inch diameter was placed on the surface of a sample of a thin, light weight polyethylene foam. The sample was maintained in an oven at 32° Centigrade for one day. A slight load of about 0.06 to 0.12 lb$_f$/in$^2$ was applied to the window to simulate packaging conditions in which a product having a glass-like or highly polished surface is packaged in a thin, light weight polyethylene foam. Thereafter, the KBr crystal was removed from the oven and analyzed to show the amount of compound transferred to the surface of the crystal.

Each sample was subjected to FT-IR analysis and curves of absorbance versus wavenumber were generated. The area under the peak at 1730 cm$^{-1}$ was integrated to calculate the amount of compound that was transferred to the surface of the crystal. The ratio of the amount of compound transferred to the crystal surface to the amount of compound originally on the surface of the foam was determined. This ratio was then multiplied by 100 to convert it into a percentage of transfer of compound from foam to glass. The above procedure was repeated for all of the compounds shown in Table 2.

additive. The benchmark additive is the commercial grade GMS, so the greasiness factor for this particular GMS is 1.0. The percent reduction in grease-like transfer is reported in Column 8 of Table 2.

Figure 3:
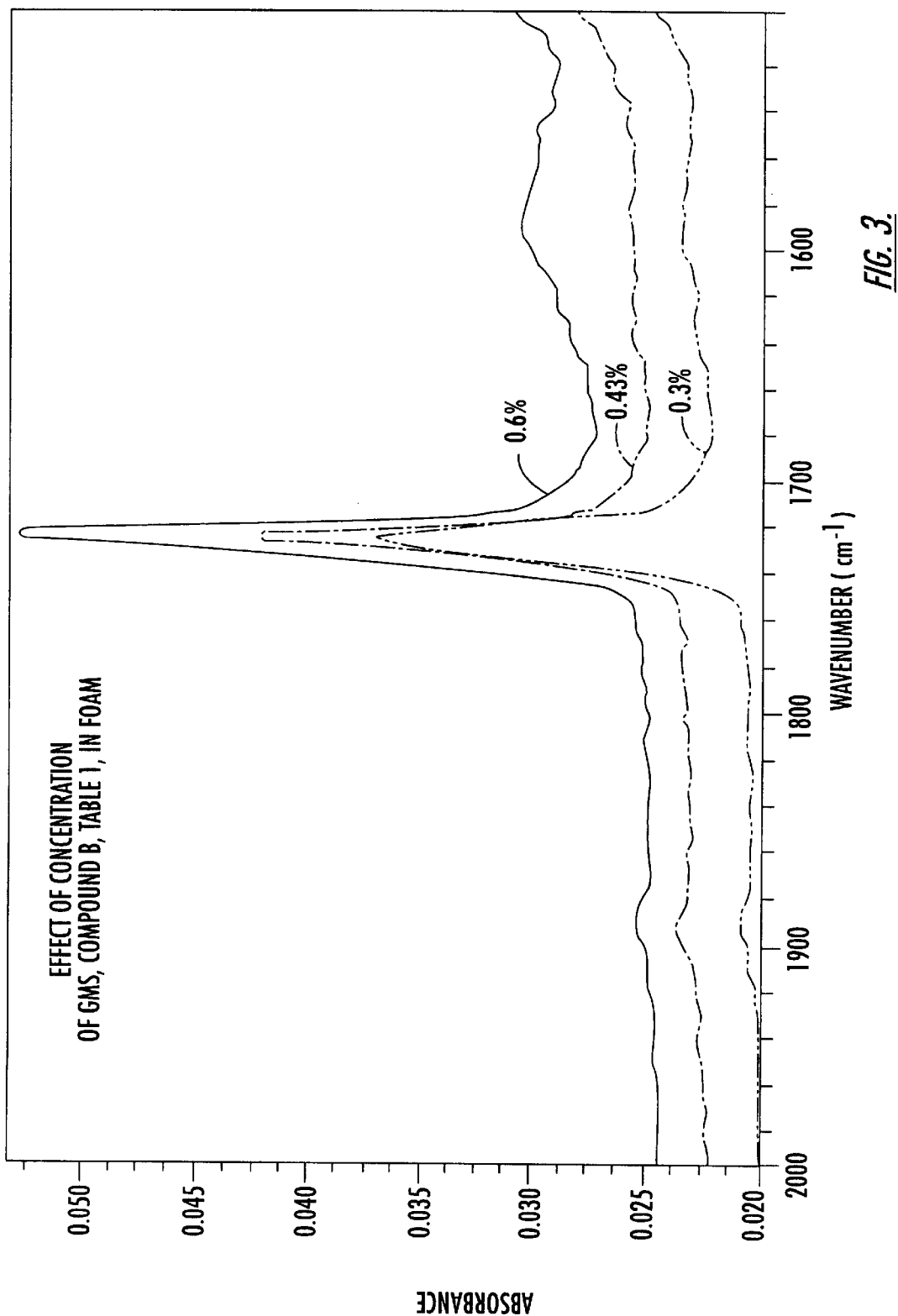
FIG. 3 is a plot showing the effect of an increase in concentration of GMS in polyethylene foams on its absorbence at various wavelengths.

Example 1 was with the same GMS additive used in Example 7, but at a 0.4 percent concentration rather than at a 1.2 percent concentration. The grease-like transfer factor, expressed as a percentage of greasiness, was only 66 percent for a 16.1 percent transfer of additive from foam to glass, which shows that the amount of grease-like transfer of an additive is also dependent upon the concentration of the additive in the resin from which the foam is made. FIG. 3 shows the effect of concentration of process additive in a plot of absorbance versus wavenumber for GMS at various concentrations.

Table 2 shows clearly that the use of compounds E and F as process additives, which are steaamide and lauramide MEA, respectively, produces a superior grease-like transfer factor with low percent transfer of the additive to the glass and a high reduction in grease-like characteristics.

Figure 4:
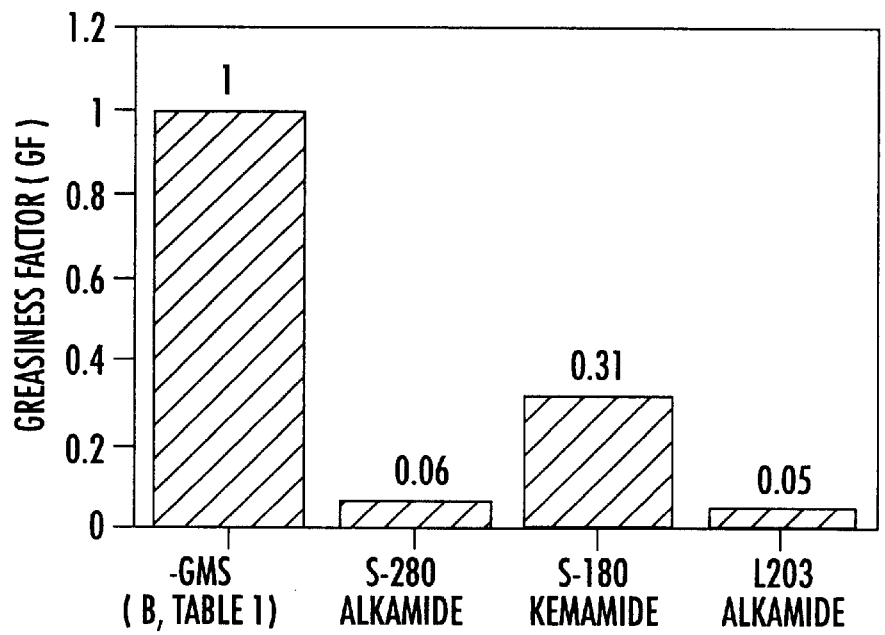
FIG. 4 is a plot comparing the property of grease-like transfer for various process additives. A commercially available GMS is given the value of 1.

The greasiness factor calculated for various compounds at different concentrations is shown graphically in FIG. 4 with the GMS additive of FIG. 2 and Example 7 as the benchmark having a grease-like transfer factor of 1. The Alkamide S-280 additive of Example 8 is shown to have a grease-like transfer factor of only 6 percent by comparison to the GMS aging modifier of Example 2. Alkamide L-203 as shown in Examples 10 and 11 also has low grease-like transfer factor.

Kemamide S-280 (C, Table 1) is shown in FIG. 4 to have a grease-like transfer factor of 31 percent and Kemamide S (D, Table 1) has been determined to have a similar grease-like transfer factor when compared to GMS. Kemamide S-280 and Kemamide S are secondary and primary aliphatic amides, respectively, and do not include an alcohol moiety as do the process additives of the invention. Kemamide S-280 and S in admixture with GMS show two distinct melting points, one for the amide and one for the ester, which does not indicate chemical interaction between these amides and GMS. While not wishing to be bound by theory, it is believed that Kemamide S-180 and Kemamide S merely

TABLE 2

| Example No. | Additive | Foam Type (thickness) | % Concentration of Additive | Melting point of additive ° C. | % Transfer of additive from foam to glass | % Greasiness Level | % Reduction in Greasiness | Comments |
|---|---|---|---|---|---|---|---|---|
| 1 | B | Black (⅛") | 0.4 | 60 | 16.1 | 66 | 34 | Greasy# |
| 2 | B | Black (⅛") | 0.4 | 60 | 5.7 | 24 | 76 | Greasy |
| 3 | A | White (.094") | 1.2 | 60 | 17.0 | 70 | 22 | Greasy |
| 4 | A | White (.094") | 0.6 | 60 | 11.6 | 48 | 57 | Greasy |
| 5 | A | White (.094") | .043 | 60 | 9.4 | 39 | 61 | Greasy |
| 6 | A | White (0.08") | 0.3 | 60 | 8.9 | 37 | 56 | Greasy |
| 7 | B | White (.074") | 1.2 | 60 | 24.2 | 100 | 0 | Greasy |
| 8 | E | White (.085") | 2.0 | 92 | 3.3 | 6 | 94 | Good* |
| 9 | F | White (.075") | 2.0 | 82 | 3.6 | 7 | 93 | Good |
| 10 | F | White (.091") | 2.0 | 82 | 2.6 | 5 | 95 | Good |
| 11 | H | White (0.9") | 1.0 | 98 | 4.2 | 10 | 90 | Good |

Greasy-like transfer clearly visible to the naked eye
*No transfer visible to the naked eye at test conditions The results calculated for the percent transfer of various additives from foam to glass is shown in Column 6 of Table 2. The percent transfer of additive from foam to glass for the benchmark Example 7 is calculated based on the peak area from FIG. 2 to be 24.2 percent. The grease-like transfer factor is calculated as the percent transfer of a particular additive divided by the percent transfer of the benchmark dilute the greasines transfer factor for GMS, in distinction to compounds E and F of the invention, as shown in Table 2 and in FIG. 4 (Alkamide S-280 and Alkamide L-203, respectively).

Figure 5:
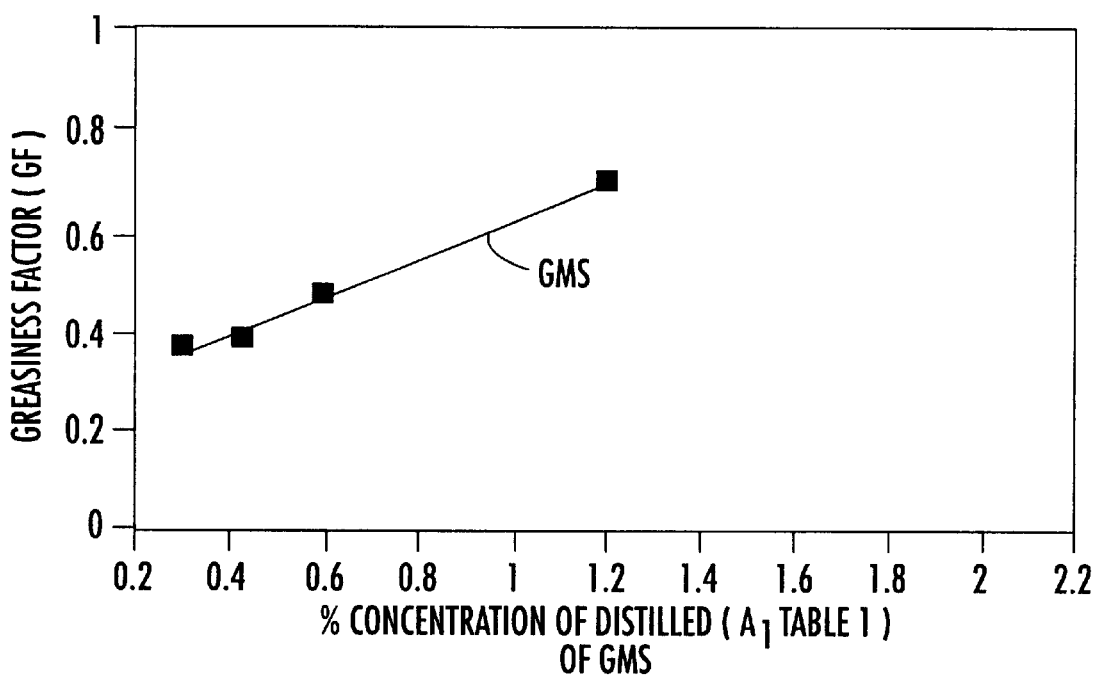
FIG. 5 shows that the grease-like transfer increases with increasing concentration of GMS.

FIG. 5 is a plot of grease-like transfer factor versus concentration for GMS and shows that the grease-like transfer factor increases with increasing concentration based on Examples 4, 5, and 6 of Table 2.

Table 3 shows 13 examples of various low density polyethylene resins used to prepare lightweight foams with various process additives. Examples 12 through 15 use a concentration of 1.3 percent by weight of a commercial GMS as the benchmark examples. Examples 16 through 22 are prepared with a mixture comprising 60 percent GMS and 40 mole percent Alkamide S-280. This mixture exhibits a single melting point of 72° Centigrade, which is some 12° Centigrade above the melting point for a commercial GMS, which is compound B, Table 1. The single melting point is thought to signify some chemical interaction between the components. Example 23 is prepared with 1 percent percent GMS and 1.3 percent SAPD by weight. The total amount of the process additive is accordingly by 2.3 percent by weight of the resin and comprises 44 percent GMS and 56 percent SAPD. Example 24 is prepared with 0.5 percent percent GMS and 0.5 percent SAPD by weight for a 50/50 blend of GMS and SAPD at 1 percent of the resin by weight.

As can be seen, the standard FT-IR test shows that the grease-like transfer level of the foams was substantially reduced or eliminated as compared to GMS used alone. The foam samples of Table 3 were evaluated by heating in an oven at 40° centigrade for 24 hours in contact with KBr glass windows. Negligible levels of grease-like transfer were achieved when GMS was mixed with stearyl monoethanolamide (stearamide MEA).

Examples 30 through 33 are also examples of the invention. Example 30 is similar to Examples 27 through 29 and shows a clean foam with substantially no detectable grease-like transfer. Examples 31, 32, and 33 show a mixture of GMS and Alkamide LIPA (Example 31) and SAPD (Examples 32 and 33) in the volume percentages shown in Table 4 for each ingredient. These additives resulted in foams that are only sightly greasy and have a low transfer percentage compared to GMS alone.

TABLE 4

| Example | Aging Modifier | Foam Density, pcf | % Greasiness (from FT-IR) | % Transfer | Visual Comments |
|---|---|---|---|---|---|
| 25 | 1.3% A | 1.17 | 20.7 | 86.6 | Greasy |
| 26 | 1.3% A | 1.35 | 23.9 | 100 | Greasy |
| 27 | A/E mix† | 1.19 | 1.7 | 4.9 | Clean, greaseless |
| 28 | A/E mix | 1.74 | 1.1 | 4.6 | Clean, greaseless |
| 29 | A/E mix | 1.55 | 1.1 | 4.6 | Clean, greaseless |
| 30 | 1.1% A/E mix | 1.2 | <0.7 | <2.5 | Clean |
| 31 | 1.5% A/G mix* | 1.4 | 4.9 | 19.6 | Slightly Greasy |
| 32 | 2.3% A/H mix# | 1.36 | 7.3 | 30.3 | Slightly Greasy |
| 33 | 1% A/H | 1.37 | 7.2 | 30.0 | Slightly |

TABLE 3

| Example | Thickness, inches | Foam Density, pcf | Aging Modifier wt. percent | % Transfer | % Greasiness Level# | Peak Area |
|---|---|---|---|---|---|---|
| 12 | 0.95 | 1.22 | 1.3% A | 21.8 | 90.0% | 1.210 |
| 13 | 0.112 | 1.10 | 1.3% A | 21.6 | 89.2% | 1.200 |
| 14 | 0.085 | 1.29 | 1.3% A | 23.6 | 97.5% | 1.313 |
| 15 | 0.101 | 1.27 | 1.3% A | 36.6 | 151.2% | 2.035 |
| 16 | 0.119 | 1.17 | 1.7% A/E mix† | 0.9 | 3.7% | 0.050 |
| 17 | 0.125 | 1.07 | 1.7% A/E mix | 1.3 | 5.8% | 0.075 |
| 18 | 0.099 | 1.06 | 1.7% A/E mix | 1.3 | 5.8% | 0.075 |
| 19 | 0.059 | 1.3 | 1.7% A/E mix | 0.7 | 2.9% | 0.038 |
| 20 | 0.065 | 1.26 | 1.7% A/E mix | 0.9 | 3.7% | 0.050 |
| 21 | 0.060 | 1.21 | 1.1% A/E mix | <0.7 | <2.5* | <.03 |
| 22 | 0.060 | 1.40 | #.5% A/B mix | 4.9 | 19.6 | .25 |
| 23 | 0.092 | 1.36 | 2.3% A/H mix** | 7.3 | 30.3 | .40 |
| 24 | 0.095 | 1.37 | 1.0% A/H mix## | 7.2 | 30.0 | .40 |

†A/E mix is a 60:40 mixture by weight percent comprising Additives A and E (Table 1).
Benchmarked with 1.3% Additive A in absolute values.
*Limit of method of detection is 2.5% greasiness level with GMS control arbitrarily set at 100%.
**A/H mix is a 44:56 mixture by weight percent comprising additives A and H (Table 1).
A/H mix is a 50:50 mixture by weight percent comprising additives A and H (Table 1).

Figure 6:
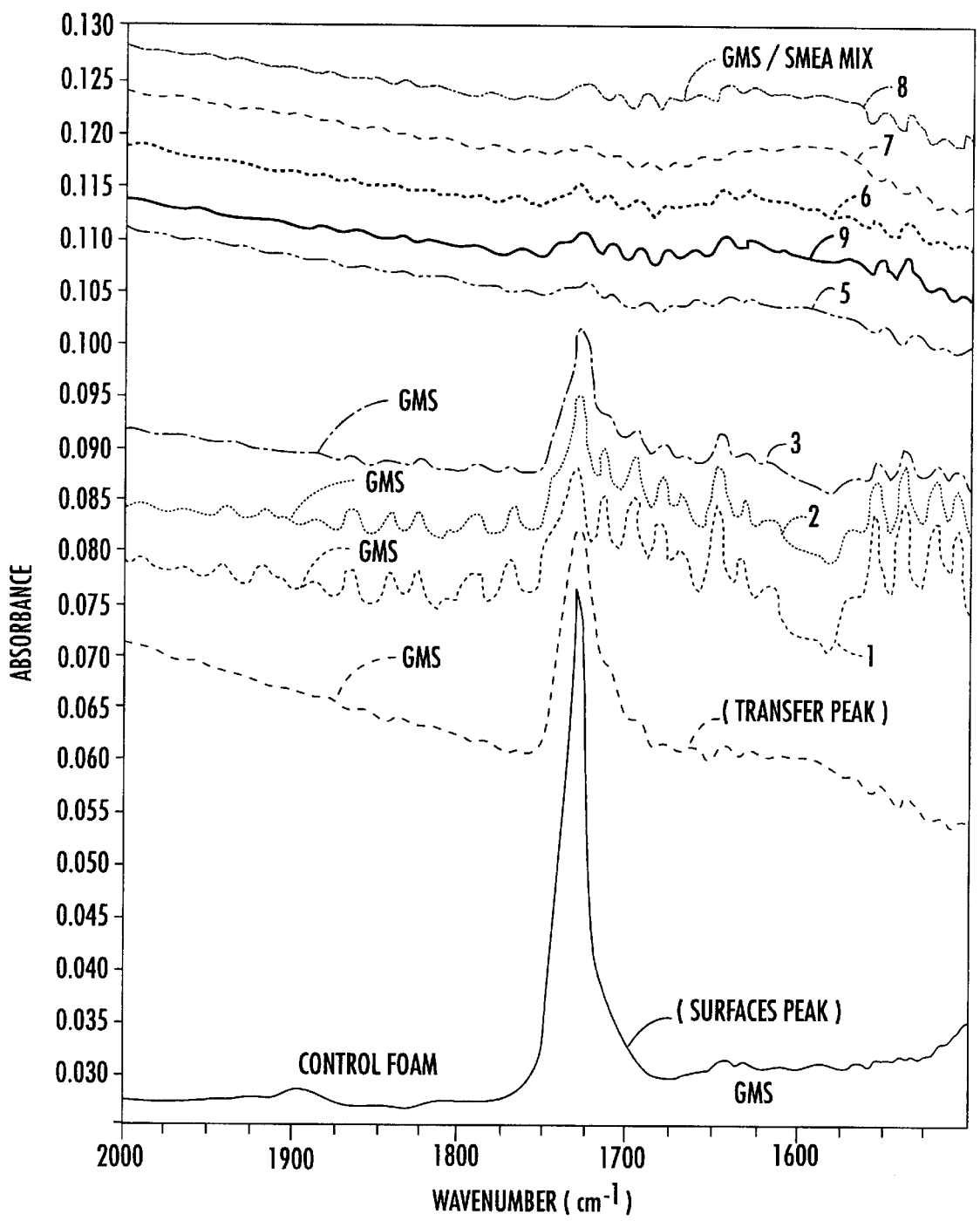
FIG. 6 is a plot comparing absorbance peaks for several process additive compositions.
Figure 7:
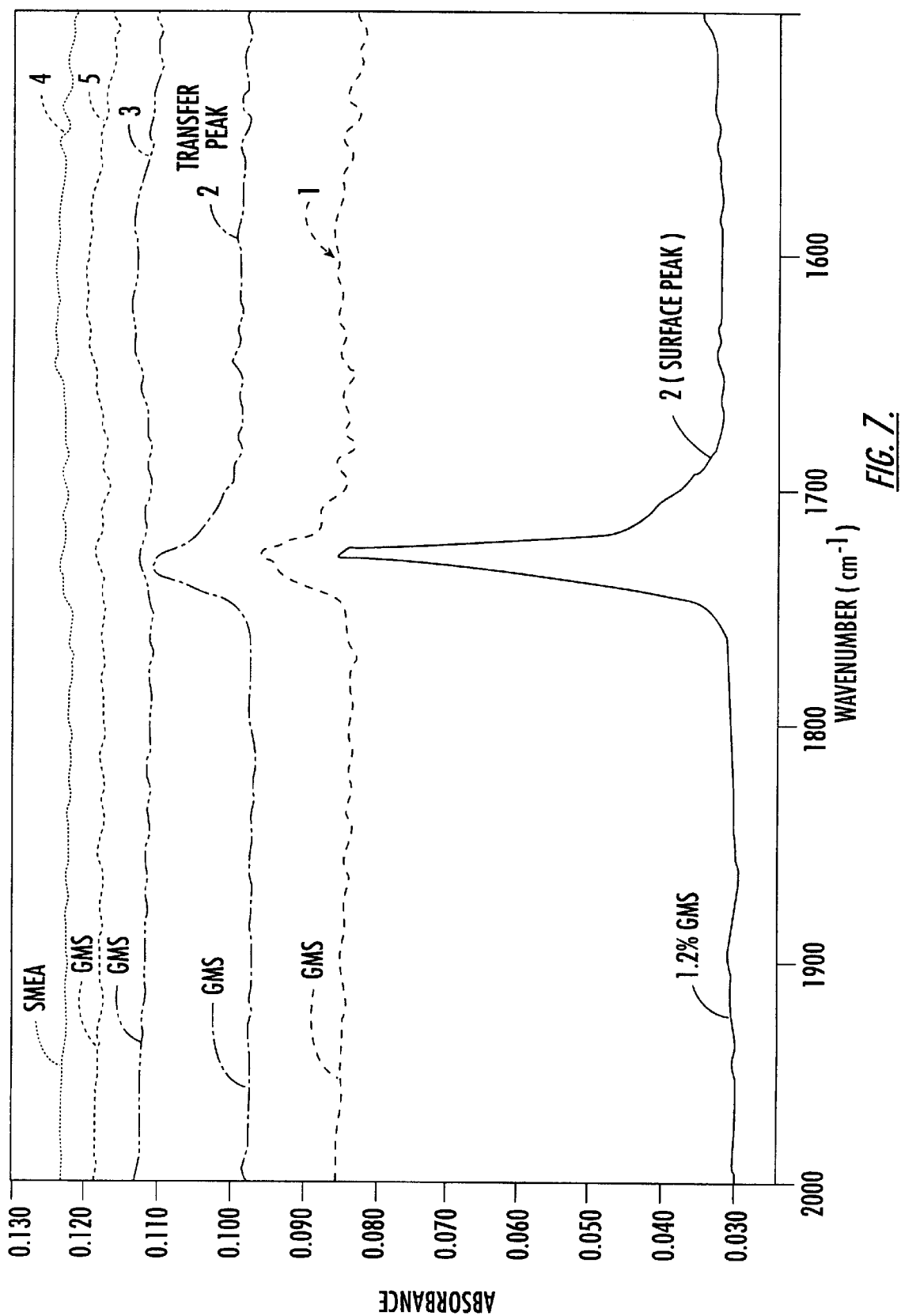
FIG. 7 is a plot comparing absorbance peaks for several process additive compositions.

FIG. 6 shows a plot for Examples 12 through 20 of Table 3 of absorbance versus wavenumber, which gives an indication of the grease-like transfer properties of the foam product. Examples 16, 17, 18, 19, and 20, which are examples of the invention, show negligible grease-like transfer properties and virtually no peak.

Table 4, below, shows nine examples of the use of various compounds as process additives in thin foam sheets. Example 26 is the control example in which 1.3 percent of GMS was used as the process additive. Examples 27, 28, and 29, which are examples of the invention, show a mixture comprising 1.3 percent GMS with from 0.6 to 0.8 percent stearamide MEA. Examples 27 through 29 show a clean foam with substantially no grease-like transfer visible to the unaided eye. The results for each of these five examples is plotted in FIG. 7.

TABLE 4-continued

| Example | Aging Modifier | Foam Density, pcf | % Greasiness (from FT-IR) | % Transfer | Visual Comments |
|---|---|---|---|---|---|
| | mix** | | | | Greasy |

†A/E mix is a 60:40 mixture by weight % comprising Additives A and E (Table 1).
*A/G mix is a 67:33 mixture by weight % comprising Additives A and G (Table 1).
A/H mix is a 44:56 mixture by weight % comprising Additives A and H (Table 1).
**A/H mix is a 50:50 mixture by weight % comprising Additives A and H (Table 1).

The fatty acid N-aliphatic alcohol amide provides suprisingly excellent results in the reduction of grease-like transfer in low density foams as compared to traditional aging modifiers such as a GMS. However, as observed above, when used in admixture, GMS and the fatty acid N-aliphatic alcohol amide can produce an even greater reduction in grease-like transfer from foams. The addition of a small amount of the fatty acid N-aliphatic alcohol amide to a GMS process additive can produce significant reduction in the grease-like transfer characteristics of a foam.

The two compounds exhibit a single melting point when used in admixture, which signifies some chemical interaction and may be responsible for the improved results. The single melting point that is exhibited by the mixture of the amide and the ester varies depending on the ratio of the ester to the amide and the aging modifier. The melting point decreases linearly as the ratio of the ester to the amide increases.

GMS has the structure of an ester of a long chain fatty acid with a polyhydric alcohol. Other esters of long chain fatty acids with polyhydric alcohols have similar properties and should be useful in the practice of the invention. Typically, the ester will be a glyceride, and somewhat more typically, a monoglyceride. The polyhydric alcohol that comprises the ester typically will be a trihydric alcohol. Where the ester is glycerol stearates, the glycerol monostearate can be either alpha glycerol monostearate, beta glycerol monostearate, or mixtures thereof with glycerol di- or tri- stearates. Typically, the ester should be present in the aging modifier in a ratio of the ester to the fatty acid N-aliphatic alcohol amide of from about 0:1 to 10:1.

The GMS and fatty acid N-aliphatic alcohol amide components are present in the aging modifier in a ratio of the GMS to the amide of from about 0:1 to 10:1. A ratio of the ester to the amide of about 2:1 is useful.

The foams are prepared by incorporating the aging modifier components in a polymeric composition and then expanding the polymeric composition. The polymeric composition will normally comprise a polyolefinic resin. The polyolefinic resin can be formed from ethylene or propylene homopolymers or copolymers of ethylene or propylene and a copolymerizable monomer. The aging modifier will typically be present in the polymeric composition in a ratio of the polyolefin resin of the aging modifier of from about 100:0.01 to 100:5. A ratio of a polyolefin to aging modifier of about 100:0.5 to 100:3 may be somewhat more typical.

The polymeric composition will also comprise a blowing agent. The blowing agent typically will be an inert gas or a hydrocarbon having from 1 to 6 carbons, or mixtures thereof. Any of the inert gases and hydrocarbon blowing agents should be useful in the practice of the invention, including carbon dioxide, either alone or an admixture with a hydrocarbon blowing agent.

The above invention has been described with respect to particular preferred embodiments. However, the foregoing description is not intended to limit the invention to the illustrated embodiments and the skilled artisan should recognize that variations can be made within the spirit and scope of the invention as described in the foregoing specification. The invention includes all alternatives, modifications, and equivalents that may be included within the spirit and scope of the invention as defined by the appended claims.

What is claimed is:

1. A polyolefinic composition comprising an expanded polyolefin; at least one fatty acid N-aliphatic alcohol amide; wherein the amide N is secondary or tertiary; and an ester of a long chain fatty acid with a polyhydric alcohol; wherein said ester and said amide are present in said composition in a ratio of said ester to said amide of from about 0:1 to 10:1.

2. The polyolefinic composition of claim 1 wherein said ester and said amide have a substantially single melting point that varies depending upon the ratio of said ester to said amide.

3. The polyolefinic composition of claim 1 wherein said amide is a secondary amide.

4. The polyolefinic composition of claim 1 wherein said amide is a fatty monoalkanol amide.

5. The polyolefinic composition of claim 1 wherein the fatty acid portion of said amide has from about 8 to 30 carbons.

6. The polyolefinic composition of claim 1 wherein the fatty acid portion of said amide is selected from the group consisting of coconut, lauric, palmitic, stearic, and oleic moieties.

7. The polyolefinic composition of claim 1 wherein the aliphatic alcohol portion of said amide is a monohydric alkyl alcohol moiety of from about 1 to 6 carbons.

8. The polyolefinic composition of claim 7 wherein said monohydric alkyl alcohol moiety is selected from the group consisting of methanol, ethanol, propanol, butanol, pentanol, and hexanol moieties, and isomers thereof.

9. The polyolefinic composition of claim 1 wherein the aliphatic alcohol portion of said amide is a polyhydric alcohol moiety of from about 1 to 6 carbons with from 2 to 5 hydroxyl moieties.

10. The polyolefinic composition of claim 9 wherein said polyhydric alcohol moiety is a glycol radical.

11. The polyolefinic composition of claim 1 wherein said amide is selected from the group consisting of fatty monoethanolamide, fatty 2,3-propanediol amide, and fatty isopropanol amide.

12. The polyolefinic composition of claim 1 wherein said composition is a foam.

13. A polyolefinic composition comprising an expanded polyolefin, an amide that is the reaction product of a fatty acid and an alkanolamine, and an ester of a long chain fatty acid with a polyhydric alcohol, wherein said ester and said amide are present in a ratio of about 2:1.

14. The polyolefinic composition of claim 13 wherein said alkanolamine is secondary amine.

15. The polyolefinic composition of claim 13 wherein said alkanolamine is selected from the group consisting of ethanolamine, isopropanolamine, propanolamine, betapropanolamine and 2,3-propanediol amine.

16. The polyolefinic composition of claim 13 wherein said fatty acid has from 8 to 30 carbons.

17. The polyolefinic composition of claim 13 wherein said fatty acid is selected from the group consisting of coconut, lauric, palmitic, stearic, and oleic acids.

18. A polyolefinic composition comprising an expanded polyolefin; a molecule having the formula R—CON(R')R", wherein R is a fatty alkyl radical having from about 8 to 30 carbons, R' is selected from the group consisting of hydrogen, an alkyl radical of from about 1 to 6 carbons, and an alkyl alcohol radical of from about 1 to 6 carbons, and R" is a mono or polyhydric alcohol radical of from about 1 to 6 carbons; and an ester of a long chain fatty acid with a polyhydric alcohol in a ratio of said ester to said amide of about 2:1.

19. The polyolefinic composition of claim 18 wherein R' and R" are selected from the group consisting of monohydric alkyl alcohol radicals, polyhydric alkyl alcohol radicals, and mixtures thereof.

20. The polyolefinic composition of claim 18 wherein R' is hydrogen and R" is selected from the group consisting of methanol, ethanol, propanol, butanol, pentanol, and hexanol radicals, isomers thereof, and mixtures thereof.

21. The polyolefinic composition of claim 18 wherein said ester is glycerol monostearate.

22. The polyolefinic composition of claim 18 wherein said ester is a mixture of glycerol mono-, di-, and tri-stearates.

* * * * *